United States Patent
Kahn (10) Patent No.: US 8,275,119 B2
(45) Date of Patent: Sep. 25, 2012

(54) SERVICES AND TRANSACTIONS IN A TELEPHONY NETWORK

(75) Inventor: Ari Kahn, Parkhurst (ZA)

(73) Assignee: Ari Kahn, Mt. Shasta, CA (US)

( * ) Notice: Subject to any disclaimer, the term of this patent is extended or adjusted under 35 U.S.C. 154(b) by 19 days.

(21) Appl. No.: 10/562,343

(22) PCT Filed: Jul. 12, 2004

(86) PCT No.: PCT/IB2004/002252
§ 371 (c)(1),
(2), (4) Date: Aug. 9, 2006

(87) PCT Pub. No.: WO2005/006725
PCT Pub. Date: Jan. 20, 2005

(65) Prior Publication Data
US 2007/0189496 A1 Aug. 16, 2007

(30) Foreign Application Priority Data
Jul. 10, 2003 (ZA) .................................. 2003/5333

(51) Int. Cl.
*H04M 1/00* (2006.01)
(52) U.S. Cl. .............. 379/350; 379/355.01; 379/355.05; 379/355.06; 379/355.07; 379/355.08
(58) Field of Classification Search .................. 455/566, 455/412, 415, 450; 379/88.11
See application file for complete search history.

(56) References Cited

U.S. PATENT DOCUMENTS

| | | | |
|---|---|---|---|
| 5,163,083 A | 11/1992 | Dowden et al. | |
| 5,181,237 A | 1/1993 | Dowden et al. | |
| 5,185,781 A | 2/1993 | Dowden et al. | |
| 5,272,749 A | 12/1993 | Masek | |
| 5,408,060 A * | 4/1995 | Muurinen | 200/314 |

(Continued)

FOREIGN PATENT DOCUMENTS

EP 0 969 644 A1 1/2000

(Continued)

OTHER PUBLICATIONS

Last-call return, Wikipedia, http://en.wikipedia.org/wiki/*69, Last Modified on Jun. 13, 2010 at 21:59.

(Continued)

*Primary Examiner* — Joseph J Nguyen
(74) *Attorney, Agent, or Firm* — Marc S. Kaufman; Reed Smith LLP (57) ABSTRACT

A method of operating a telephony service on a telephony network is disclosed. The method comprises the steps of establishing and/or requesting a telephonic connection and/or a call between a caller and a call recipient, receiving a command signal initiated by the caller and/or the call recipient and/or the telephony network during any phase in the call process, the command signal comprising a data signal and/or tone, and initiating a service to the caller and/or the call recipient, or initiating a transaction between the caller and the call recipient in response to receiving the command signal other than a standard call connect and/or disconnect command. Preferably, the data signal and/or tone relates to one of the "*", "0" or "#" keys of the telephone equipment of the caller, wherein each of the "*", "0" or "#" keys is associated with a different category of service or transaction.

30 Claims, 2 Drawing Sheets

U.S. PATENT DOCUMENTS

| | | | |
|---|---|---|---|
| 5,581,607 A | 12/1996 | Richardson, Jr. et al. | |
| 5,703,943 A * | 12/1997 | Otto | 379/265.11 |
| 5,966,652 A * | 10/1999 | Coad et al. | 455/412.1 |
| 6,055,439 A * | 4/2000 | Helin et al. | 455/550.1 |
| 6,138,006 A | 10/2000 | Foti | |
| 6,307,928 B1 | 10/2001 | Yamasaki | |
| 6,463,139 B1 | 10/2002 | Davitt et al. | |
| 6,700,962 B1 * | 3/2004 | Albal et al. | 379/126 |
| 6,728,349 B2 | 4/2004 | Chang et al. | |
| 6,870,918 B1 * | 3/2005 | Crowson et al. | 379/207.02 |
| 7,162,022 B2 * | 1/2007 | Jupe et al. | 379/210.02 |
| 7,164,936 B2 * | 1/2007 | Heatley | 455/566 |
| 2001/0050982 A1 | 12/2001 | Simonen et al. | |
| 2002/0034280 A1 * | 3/2002 | Infosino | 379/88.02 |
| 2002/0085701 A1 * | 7/2002 | Parsons et al. | 379/211.01 |
| 2004/0029561 A1 | 2/2004 | Holter et al. | |
| 2004/0058667 A1 | 3/2004 | Pienmaki et al. | |
| 2004/0119755 A1 * | 6/2004 | Guibourge | 345/827 |
| 2004/0234052 A1 * | 11/2004 | Lebowitz et al. | 379/88.19 |

FOREIGN PATENT DOCUMENTS

| | | |
|---|---|---|
| EP | 1024463 | 8/2000 |
| EP | 1 271 911 A1 | 1/2003 |
| EP | 1271911 A1 | 1/2003 |
| JP | 4265050 | 9/1992 |
| RU | 2195081 | 12/2002 |
| WO | 2000/49793 | 8/2000 |
| WO | WO 01/76299 A1 | 10/2001 |

OTHER PUBLICATIONS

Vertical service code, Wikipedia, http://en.wikipedia.org/wiki/Vertical_service_code, Last Modified on Mar. 28, 2010 at 00:44.

International Preliminary Report on Patentability, Patent Cooperation Treaty for PCT/IB2004/002252, Date of issuance of report Jan. 16, 2006.

Communication pursuant to Article 94(3) EPC, European Patent Office, date Aug. 8, 2008.

International Search Report of PCT/IB2004/002252 dated Oct. 26, 2004.

Australian Government IP Australia—First Examination Report dated Oct. 28, 2008.

China—First Official Action dated unknown.

China—Letter from foreign associate regarding Second Official Action dated Nov. 11, 2009.

China—Second Official Action dated Nov. 6, 2009 (in Chinese).

China—Letter from foreign associate regarding Third Official Action dated Apr. 28, 2010.

China—Third Official Action dated Apr. 22, 2010 (in Chinese).

China—Letter from foreign associate regarding Fourth Official Action dated Jun. 23, 2011.

China—Fourth Official Action dated Jun. 2, 2011 (in Chinese).

Europe—Communication Pursuant to Article 94(3) EPC dated Aug. 28, 2008.

India—Letter from foreign associate regarding First Examination Report dated Feb. 16, 2009.

India—First Examination Report dated Jan. 2, 2009.

Japan—Notification of Ground for Rejection dated Nov. 10, 2009.

Japan—Notification of Decision of Final Rejection dated Jan. 25, 2011.

Korea—Letter from foreign associate regarding First Official Action dated Apr. 1, 2011.

Korea—First Official Action dated Feb. 21, 2011 (in Korean).

Norway—Communication Pursuant to Article 94(3) EPC dated Aug. 28, 2008.

Russia—Letter from foreign associate regarding First Official Action dated Sep. 1, 2006.

Russia—First Official Action dated Jul. 24, 2006 (in Russian).

Russia—Translation of the Office Action dated Sep. 19, 2008.

Russia—Translation of the Office Action dated Apr. 28, 2011.

* cited by examiner

Fig.1

SERVICES AND TRANSACTIONS IN A TELEPHONY NETWORK

BACKGROUND OF THE INVENTION

THIS invention relates to a method of operating a telephony service on a telephony network.

At present telephony networks, and in particular mobile telephony networks, are primarily used to enter a telephone number, press SEND to connect and then END to disconnect. This is underscored by the fact that telephony still accounts for around 91% in global mobile telephony revenue generation. This observation provides a valuable metric when evaluating new mobile telephony technologies, as most people still consider the mobile telephone to be a cordless telephone.

Attempts are increasingly being made to exploit the capabilities of modern telephony networks in order to provide enhanced services to users of the networks. For example, enhancements to existing telephony services include the increasing use of IVR centers, subscription services which transmit information to subscribers on a selective basis by SMS, and the like. Various forms of banking have also been proposed for users of mobile networks.

To achieve the above additional functionalities, vast sums of money have been spent in developing suitable mobile data bearers and protocols, including PLUS USSD CSD (SMS) WAP HSCSD WIG EDGE UM OTA GPRS MMS 3G UMTS, with each one having a varying degree of success and customer acceptance. Even PLUS (e.164), the service that is the essence in Global Service Mobile (GSM) roaming, remains problematic as few succeed in locating the symbol to enter numbers in this notation.

The notable exception up to now is SMS, and even though it has emerged as the most successful mobile data protocol thus far, the revenues it generates are paltry when compared to the highly sustainable and widely accepted wireless telephony service.

It is believed that the key to success in mobile data services is based on how seamlessly services can be addressed using the standard 12 digit telephone keypad, and it is rather telling to note that telephony and SMS are both dial addressed services. Thus, although it is attractive to users of a telephony network to have access to additional services, it is important that such services should be as simple to use as possible in order for them to be widely adopted.

In view of the above, it is believed that the litmus test for any new cellular technology wanting to gain mass acceptance is whether it can preserve the current behavior in dialing telephone numbers. Today, several generations later, and as many technology advances, the industry is still all about SEND and END and the associated recording of air time consumption that results in revenue generation.

It would therefore be desirable to provide a signaling method that succeeds in bridging the voice and data divide by switching the call context on demand, to encapsulate the said data methods and services in the voice (telephony) established connection.

SUMMARY OF THE INVENTION

According to the invention there is provided a method of operating a telephony service on a telephony network, the method comprising:
  establishing and/or requesting a telephonic connection and/or a call between a caller and a call recipient;
  receiving a command signal initiated, by the caller and/or the call recipient and/or the telephony network during any phase in the call process, the command signal comprising a data signal and/or tone; and
  initiating a service to the caller and/or the call recipient, or initiating a transaction between the caller and the call recipient in response to receiving the command signal other than a standard call connect and/or disconnect command.

Preferably, the command signal is initiated by the caller during a call set-up phase and/or a call connected phase.

The call recipient may be any person, company or other entity with a directory and/or dialed telephone number.

Conveniently, the method includes the step of prompting the caller and/or the call recipient to provide the command signal. In one version of the invention, after the caller issues a call connect command and before conventional switching and routing commences, an Operator Issued Prompt is delivered to the caller, such as "Key now to engage interactive service." This arrangement advantageously allows the caller to send a command signal immediately after dialing the desired telephone number. This time period can also advantageously be used to allow the telephony network to notify the caller of any new services being offered by the network.

Preferably, the service and/or transaction are/is automatically assembled in response to various criteria, including the caller and/or call recipient attributes and the called destination.

Typically, the caller and/or call recipient attributes include credit and availability, and the called destination include mobile or fixed, and national or international.

Alternatively, the command signal is issued by the caller prior to the call connect command. In this regard, the command signal can either be prefixed or postfixed to the recipient's directory and/or dialed telephone number, so that no additional signaling is required by the caller as the destination address now encapsulates the said command signal.

In this regard, it must be noted that dial addressing in the PLMN and PSTN contexts are reversed in that the former uses postfixed addressing, wherein the user keys the dialed digits first and then presses SEND/connect, and the latter prefixed, wherein the handset is lifted OFFHOOK/connect first and then the digits are dialed and switch preemptively. The signaling described in the present invention is thus typically indicated by postfixed dialing the PLMN before SEND, thereby preserving the international number format, and by prefixed dialing on the PSTN, thus signaling the switch in advance, as this then allows the said methods to be invoked before conventional routing and switching commences.

The data signal and/or tone typically relates to one of the "*", "0" or "#" keys of the telephone equipment of the caller.

Alternatively, and/or in addition, a dedicated key may be used to provide the command signal, with the telephone keypad typically being modified accordingly.

This dedicated key can be selected from a group comprising the "@" symbol, a colour coded key, and a programmable key and/or menu and/or button.

In addition, the command signal can be provided using a biometric trigger, based on either voice and/or fingerprint recognition.

Preferably each of the "b", "0" or "#" keys is associated with a different category of service or transaction.

For example, the "*" key may be associated with telephony and billing functions, the "0" key may be associated with interactive network operator and information services access, and the "#" key may be associated with commercial banking transactions between the caller and the call recipient.

The command signal may comprise audio tones such as DTMF (dual tone multi-frequency) signals, or data signals such as USSD (unstructured supplementary services data) signals or signals transported over control channels and/or the network from a mobile telephone, for example.

The method preferably includes the step of automatically associating a function indicated by the command signal with the caller as identified by the directory telephone number of the caller.

The directory telephone number of the caller may be established by caller line identity (CLI), for example.

The method may include the step of automatically associating the function indicated by the command signal with the call recipient, as indicated by the directory telephone number entered when establishing the telephonic association.

DESCRIPTION OF EMBODIMENTS

In this specification the term "establishing" means signalling a call connect command that begins the process of establishing a call between a caller and a call recipient.

The term "command" means a single command that is interpreted by the telephony service without the necessity of any additional command being sent. Typically the command signal is related to one individual, key on a standard 3×4 keyboard matrix on the telephone equipment.

In this specification the phase "in communication" includes the connected phase where the caller and call recipient are communicating and when the command described in the present invention is signalled by one party the network may then automatically place the other party on hold. Once the method of the invention has been completed the network automatically reconnects the party on hold.

The phase "in communication" includes the originating (set-up) phase following the call connect (send) signal where the operator switch is signalled and where the logical association between the caller and call recipient is established.

The phase "in communication" also includes the terminating (set down) phase, typically when ridging the call recipient prior to the call being answered the switch suspends the connection on receiving the command described in the present invention.

The phase "in communication" also includes the dial phase where the command described in the present invention may prefix or postfix or be embedded within the call recipient directory telephony number prior to the connect command being sent.

The phase "in communication" also includes the disconnecting phase when either party has terminated the connection or the network has inadvertently dropped the connection which may still persist for a brief period in time during which either connected party may invoke the method.

"In communication" also includes the diverting phase when one party disengages the connection either manually and/or when the network automatically diverts the connection when applying certain subscriber settings, for example diverting to voicemail when call recipient is busy or unavailable.

Figure 1:
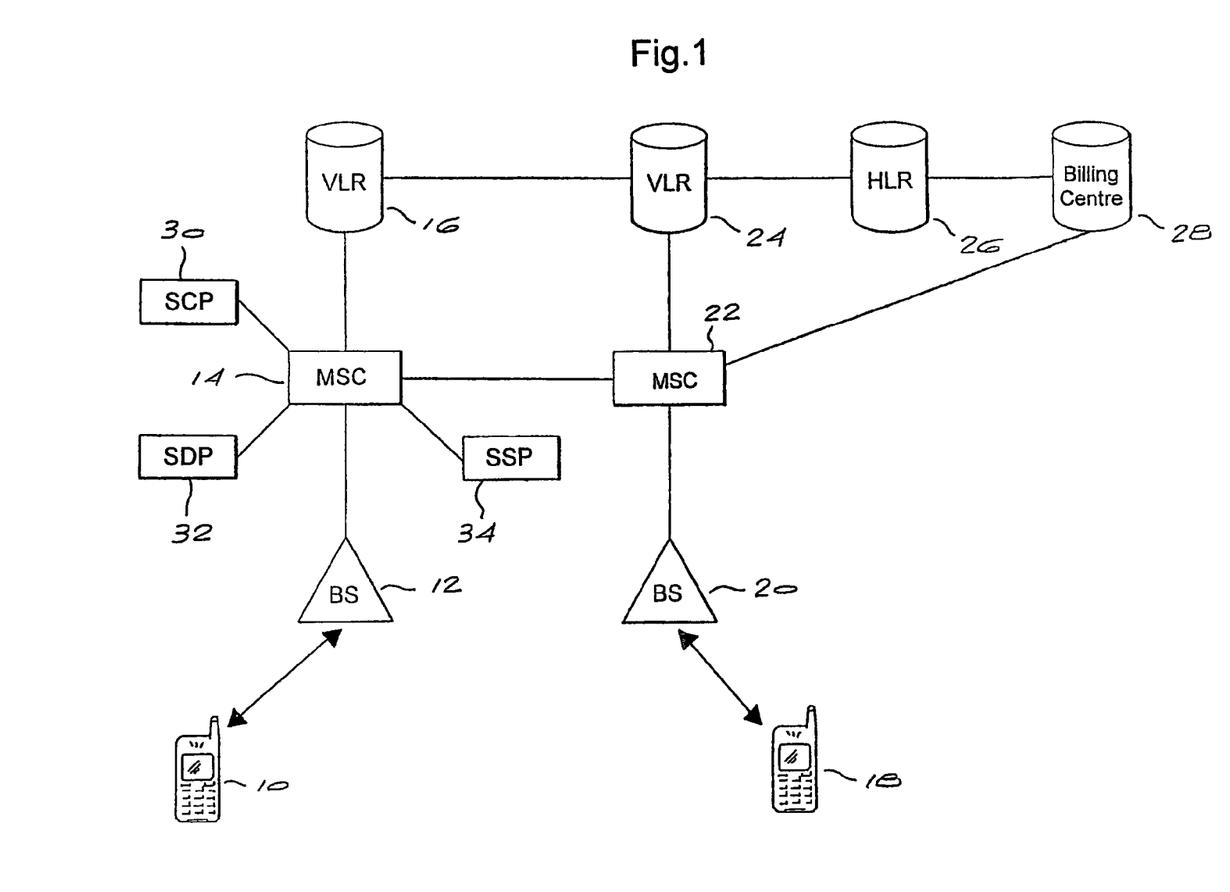
FIG. 1 is a simplified diagrammatic illustration of a telephony network arranged to implement the method of the invention.

FIG. 1 shows, in a highly simplified schematic form, the architecture of a modem GSM mobile telephone network. The diagram does not purport to be comprehensive but merely illustrative. The network will typically embody intelligent network (IN) functionality.

In the illustrated network, a mobile telephone or mobile station (MS) 10 of a caller communicates with a first base station 12 which in turn communicates with a mobile switching center (MSC) 14. The base station 12 forms part of a base station system (BSS) which comprises a base station controller (BSC) and a base transceiver station (BTS) with associated antenna (not shown). Associated with the mobile switching center 14 is a visited location register (VLR) 16.

A call recipient has a mobile telephone or mobile station 18 which communicates with a second base station 20. The base station 20 is connected to a further mobile switching center (MSC) 22 with its own associated visited location register (VLR) 24. (In some cases, the two base stations could be connected to the same MSC.) The respective mobile switching centers 14 and 22 and the respective visited location registers 16 and 24 are interconnected as shown. The visited location registers are also connected to a home location register (HLR) 26 and to a billing center 28. The MSCs 14 and 22 are also connected to the billing center 28. The HLR is a central database containing data relating to the account status and predetermined network settings of subscribers. The VLRs are decentralised databases which are updated with data from the HLR relating to a particular subscriber when that subscriber's telephone connects to the MSC in question.

Connected to the MSC 14 are a service control point (SCP) 30, a service data point (SDP) 32 and a service switching point (SSP) 34.

The SCP 30 of the MSC 14 servicing the call recipient has terminating screening logic which is invoked when calls are set to route to the call recipient. The SDP is a database associated with the SCP containing data associated with the caller.

The SSP is an optional intelligent network component forming part of a switching subsystem which essentially defines a network layer associated with switching services.

The present invention proposes the utilisation of intelligent network functionality to provide additional services and transaction capabilities which are not currently available to users of telephony networks. In particular the invention creates the ability to operate services and conduct transactions within the call setup phase as well as in the physical connected phase using conventional telephony methods. The methods described herein may work on standard telephony networks.

The heart of the present method resides in the automatic recognition by the network of the identity of a caller accessing the network and a call recipient with whom the caller establishes a conventional telephone connection. Then, either during the call setup process or while the two parties are actively engaged in communicating, that is, while the telephony call is in progress, the caller and/or the call recipient send command signals to the network instructing the network to provide predetermined services' to the caller and/or the call recipient, or to initiate a transaction between the two parties.

The network is set up to associate a signal generated by pressing the "*", "0" or "#" key on the caller's or call recipient's telephone during the call setup process or while the call is in progress, with respective predetermined functions, which are then implemented in real time or near real time. This obviates the need for the laborious entering of strings of text, account numbers or other such data by the caller and the call recipient, as the crucial data identifying the parties is automatically recognised by the network.

Figure 2:
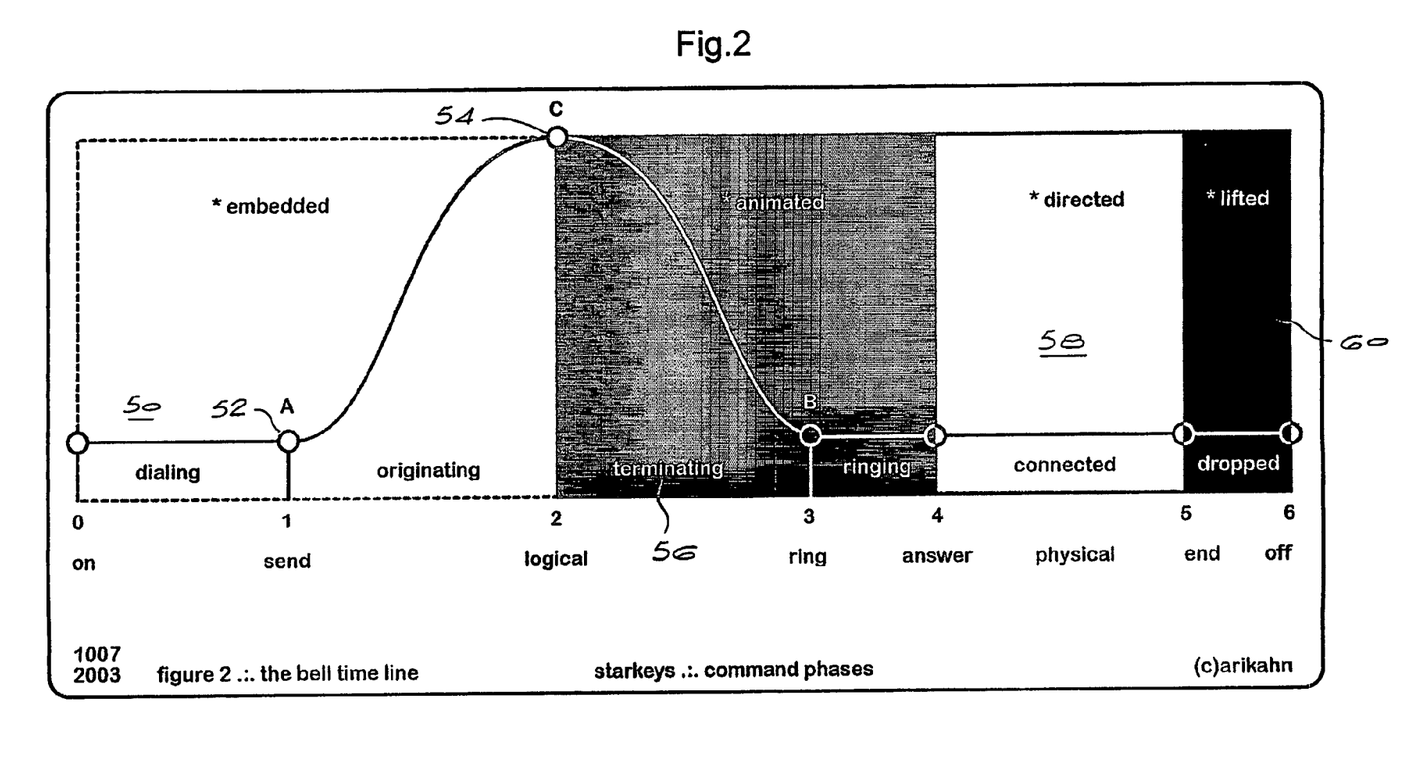
FIG. 2 is a schematic diagram illustrating the operation of the method.

FIG. 2 depicts a typical telephony communication timeline from powering on to powering off a mobile telephone and all the phases in communication that exist when establishing a telephonic connection. The dial phase 50 is when the caller A enters the dial digits comprising the directory telephone number of the call recipient B. Caller A at this point may also enter the command described in the present invention.

The originating phase 52 begins when the caller A presses the "send" or connect button and the mobile telephone signals the MSC to set up the call. During this phase the network has not yet established the caller and call recipient association. The portion of the diagram marked 54 represents the moment the logical association between the caller and the call recipient is established and typically happens in the MSC once the switch has completed analyzing the dialed digits.

The terminating phase 56 is when the switch has completed the logical association and on detecting the commands embedded and/or signalled during this phase the network typically suspends the call to enable the caller to conduct the services or transactions. Once these have been conducted the network resumes call routing and signaling and ringing the call recipient when available.

The terminating phase is typically where any subscriber divert settings are applied. When the call recipient is offline and unavailable this divert commonly routes the call to a voicemail platform.

The connected phase 58 is when call recipient answers the call and it is within this phase that the commands may be conducted in both directions between the caller and call recipient depending on which party initiates the command signal.

It will be appreciated that in conventional telephony services communication between a caller and a call recipient only occurs during the connected phase. The present invention allows services and transactions to occur between the parties at any time once the association between the parties has been established.

The drop phase 60 is when one party has signalled a call disconnect and/or the network inadvertently drops the call and for a brief period in time the other party may still be connected and may signal the command and invoke the method. At this moment in time the network may automatically reconnect, the two parties with minimum network costs since the location and routing information is still available.

Thus, it will be appreciated that the invention enables the services and transaction methods to be activated and conducted without necessarily physically connecting through to the call recipient. This is advantageous since it requires minimum network resources and allows local transacting on the home network, even when dialing international caller directory numbers. This enables services and transactions to be effected between two defined entities via standard telephony signaling without necessarily completing the call routing and connecting to the call recipient in the conventional sense. Since the services are conducted within the operator network they may be provided free or at nominal cost to the user. Thus, any caller may conduct services and transactions locally on the home network even when the call recipient is a subscriber on a foreign network simply by dialing a regular directory telephone number and issuing commands as described in this specification.

The following examples describe the method of the invention in greater detail.

When the caller dials the directory telephone number of the call recipient, a signal which effectively amounts to a call request is received by the network, via the base station 12 and the MSC 14. The VLR 16 is updated with data from the HLR 26 relating to the caller and as the call request is processed and routed via the MSC 22, the VLR 24 is updated with data from the HLR 26 relating to the call recipient and any additional data required to implement the method(s) of the invention are typically stored within the subscriber associated SDP 32.

One embodiment of the present invention proposes using the "*" key (also referred to as the star or asterisk key) to deliver operator billing services to the caller and/or the call recipient when the "*" is signalled during any phase in the communication process between the caller and the call recipient.

When a caller initiates a call the network MSC, in association with the billing centre, performs a credit verification to determine whether the caller has sufficient airtime credit (for prepaid customers) or an account in good standing (for contract customers) before allowing the call to be completed. Once the call is completed it is allowed to ring through to the call recipient. When the call, recipient answers the call, and the two parties are connected, the MSC begins recording the call time and the call duration. Conventionally, the data being recorded automatically allocates the billing for the call to one of the two parties according to a pre-determined protocol.

In a modem intelligent network where the majority of subscribers are prepaid the credit standing is continually monitored during the call enabling the network to perform real time billing to track airtime usage and prevent the call from continuing when the credit is used up.

The "*" key activated embodiment and the method which form the subject of this invention allow a command to be sent which overrides the conventional billing protocol. In operation the "*" key command is received by the operator switch, which is the first network element and node to receive the associated signal and in addition is the node on the network central to the billing process in recording the raw unprocessed CDR (ball data records) data used to bill subscribers and generate consolidated itemized billing and auditing. On receiving the star key signal the billing process is commanded to digitally transpose the A and B numbers identifying the communicating parties thus generating new billing records describing the reverse direction to conventional billing protocols. This is done without having to reestablish the call.

In this embodiment of the invention, the star command may be followed with additional star and numeric signaling invoking further functionality and services. For example, Star Once as in "*" effects reverse call billing Star Twice as in "* *" effects reverse calls automatically and repeatedly Star Num as in "* 1234567890" effects airtime transfer to the account associated with the chosen directory number. Star Twice Num as in "* *1234567890" effects repeated transfer to the account associated with the chosen directory number. Star Zero as in "* 0" requests the operator to assist with interactive methods. Star Three as in "***"s to escape the current and undo the last star method.

It should be noted that it is only the first star that commands and invokes the service and any optional and additional star and numeric signals are simply parameters that are passed on to and applied within the associated methods.

Furthermore, each command described above requiring additional numeric input may be closed with the corresponding star command as in "*120*" to indicate to the network that the command be accepted as entered without requiring verification.

When the star command is issued once without additional signaling it commands the operator to reverse the call cost. When signalled during a connected call and further when signalled by the caller the method may only have relevance when caller and called party share the costs of the call as is typical in some regions, such as the United States and here the caller then signalling to collect the call recipient's charges.

When the caller dials a directory number which requires switching outside the home network the billing methods described herein may not be available until such time as the interconnected networks enable the said services across networks and further until such time as the signaler may be notified appropriately, as in "reverse calling disabled". When transferring airtime between networks different tariffs may apply and the transfer of credit may require a normalization or conversion process. It is envisaged that network operators would simply leverage existing commercial interconnect agreements and settle on the net airtime transfer conducted between them over time.

The "*" command issued during different phases in communication may be applied with subtle differences yet consistent with the principal billing reversal method which forms the subject matter of this embodiment. For example, where the caller has insufficient credit to establish a call, the caller may invoke the "*" command during the call setup phase requesting reversal of the call billing without requiring the called party to reestablish the call in the opposite direction. By invoking the "*" command during call terminating phase authorization is being provided that the return call be automatically collected by the caller.

When the network receives the star command it may translate the signal into a recorded sound byte rather than simply playing the conventional tones and may thus generate the spoken equivalent to the command as in "star" or may generate a synthesized notification encouraging a party to collect a call as in "calling party has no airtime remaining please press star and collect the call" or simpler still as in "be a star".

When the star key is pressed once by the caller during the call set up phase, that is prior to the call being answered, the signal may be used to command the network operator to request a reverse charge call which may, for example, only be connected upon receiving the same signal from the called party in response to this request. This request to have the call collected by the called recipient may be automatically activated by the network operator when the network determines that the caller has insufficient airtime to complete a call request in the conventional sense. The network accepts and suspends the call request until the call collect request is acknowledged by the call recipient. The request to collect the charges of a call may be declined by the call recipient by pressing the end (disconnect call) button which in turn may then signal the network operator to perform the busy divert function.

Continuing with this example, and assuming the caller has insufficient airtime to make a call on the network, on receiving the collect call request the operator may connect the call to the call recipient and on presenting the request and receiving a positive response from the call recipient would reverse the call charges and connect the call. Alternatively, the network operator may permit callers with insufficient credit to be connected momentarily to the call recipient sufficient to allow the caller to ask the called party to issue the "*" command and collect the call.

When the "*" command is issued by the caller once during the terminating phase, for example when the called party is unavailable or does not answer and the ringing phase has completed or when the call is diverted to voicemail, then star may signal and command the network operator to allow the intended call recipient to return the call and for the charges associated with the call to be assumed by the original caller. Here the caller may press the "*" key even when leaving the called party voicemail since the signal is first received by the network and commands the operator in addition to potentially commanding the IVR. In this instance the tone may even be recorded in the voicemail itself performing dual functions authorizing the return call collect and notifying the called party in the recorded message that the "*" command was issued.

This particular star method authorizing the called party to call back collect has particular relevance in the business sector where companies calling customers and clients and not reaching the call recipient may now accept the return call at the expense of the company. On receiving this star command the network may automatically insert the called party subscriber telephone number into the caller SDP (service data point) group describing callers who may call and have their charges automatically collected just once. Once this party has returned the authorized call their membership in the group automatically expires in that the network then removes their number from the collect once call group.

Conversely the network may insert the calling party subscriber number into the called party group describing subscribers who may be called once collect. This scenario is potentially more network efficient in that the network may determine during the call setup phase whether or not to permit the call using originating service screening logic rather than terminating logic. Either method may require collecting party credit verification prior to actually connecting the call. Whether or not the data is recorded in the caller or called party group is dependant on how efficient the credit check procedure is and what call collect authorization process is followed.

It is envisaged that this call back collect service will be used more frequently by businesses and the contract segment of the telephone network users. Hence recording in the called party group may be more efficient since the credit check on these subscribers is less sensitive to call duration and real time monitoring. These "*" key methods in the originating and terminating phases describe a seamless reverse charge call submission and response process catering for callers who have insufficient credit to complete the call and further it also describes an authorised return call collect process.

A further embodiment of the invention is where the "*" command is used during a connected call. For example, assuming that a caller has made a conventional call the call recipient answers the call and presses the "*" key to command the network to reverse the call billing so that the call recipient assumes the call cost. This command is completed successfully provided that the call recipient has sufficient credit or airtime to collect the charges. In another scenario if the network determines that the caller has insufficient airtime to establish the call or if during an active call the credit becomes exhausted the network may automatically signal the call recipient to press the "*" key and to begin collecting the call cost. The party with insufficient credit may be placed on hold during this process.

In this instance the network itself is generating the "*" command on behalf of the subscriber whose airtime is exhausted, thus enabling the call to continue uninterrupted. Here the network may request the "*" command in several ways, for example by prompting the party it has already determined as having sufficient credit to collect the call by issuing the star frequency tones or playing a recording "please star this call to collect and continue" on behalf of the party whose credit is exhausted and allowing the signal recipient to respond with the same "*" command to indicate that the collect call request is accepted.

According to a further feature of this embodiment, when the star command is signalled twice in succession it describes what is referred to herein as the plus (+) command since mobile keyboards typically generate this symbol on the display when the star key is pressed twice in close succession. When the plus signal is commanded during any phase in the communication between caller and called party it signals and commands the network operator to record the signalled party for indefinite and automatic collect charges calling. This is notified to the beneficiary appropriately, such as by sending an SMS "u may ring me free anytime".

The plus command thus instructs the operator to record the beneficiary phone number in the subscriber SDP defining a caller group whose members are automatically reversed and collected when dialing the group owner. When the plus command is issued repeatedly to the same subscriber it instructs toggling (inserting and removing) the subscribers membership in the group. When removing the member from the group the network operator may choose to apply the method described as "collect just once" thus removing the member from the indefinite reverse caller group and inserting the subscriber into the call collect once group. It will be appreciated that this automated call collection method has positive implications for network operators in that it shifts telephony revenue generation and collection from those with limited disposable income to those with greater amounts of disposable income.

According to a further aspect of this embodiment of the invention, when the "*" command is issued once and then followed by numeric keys describing a quantum, it commands the network to transfer this amount in airtime between the communicating parties. The transfer is effected on verifying that the benefactor is in good credit standing, whereafter the benefactor is debited and the network account of the beneficiary is credited followed by confirmation that the transfer has taken place.

For example on dialing "0844432100*SEND *120*" the caller commands the network to transfer 120 airtime minutes to the dialed party and in doing so on receiving the command the network suspends the call. Once the transaction has completed the call is resumed and the caller is connected to the call recipient. In this example when the closing "*" command precedes the "send" command it submits the command without having to wait for confirmation. In instances where the call is terminated without ringing the beneficiary may be notified via SMS as in "120 mins received from 0844432101".

A further variation on the current embodiment is when the "*" command is issued twice in succession and then immediately followed by the numeric keys describing the quantum of airtime it commands the network to transfer to the dialed and/or signalled party on a repeated periodic basis (defaulting to a calendar month). This may be cancelled by entering the plus command a second time to the same subscriber with quantum specified as "00". This for example allows parents to dispense airtime to children on an automatic and regular basis as an allowance. As mentioned the frequency in the method may default to monthly however in using the star assist command as in "* *0 120" the user may then interactively select the appropriate recurring interval via IVR and/or other interactive methods such as USSD push menus the appropriate recurring interval as in days and weeks as described in the following section.

A further variation on the current embodiment is to use the "*" command key(s) followed by the zero command to request operator assistance when commanding services and/or transactions on the network. The network may interact with and notify the subscriber when the "*" commands and associated methods are invoked and completed using several existing services and technologies including IVR and SMS and USSD and GPRS methods. Typically, the notification and interaction method most acceptable is IVR where the network announces and interacts with the subscriber using audio menus and reports as in "one hundred and twenty minutes transferred successfully".

In addition all star commands may be issued with closing star commands to fast track the method overriding manual verification and/or IVR notification methods and circumventing the need to toggle the handset between visual command keying and audio notifications and responses played as described. In this instance the network may notify via USSD pushed or terminated sessions (versus the more common originated sessions) available on later generation mobile telephones to deliver an instant and interactive session to the mobile phone more immediate and user friendly than conventional SMS.

Alternatively, the network may notify the subscriber via SMS "flash" services so to speak, which send a specially encoded text message that instantly presents on the mobile display without saving the message into the phone or SIM memory.

Thus, when the star and plus commands are issued and immediately followed with the zero command as in "* *0" the network operator assisted method is summoned and typically an IVR menu is presented to guide users through a plurality of service options.

A further variation of the current embodiment involves the "*" command being signalled three times in succession. It allows "undo" and "escape" sequences to be invoked when the former is applied during the setup phases. It enables a method to undo the last transaction to the dialed party. The undo sequence may be signalled during any phase in the communication process to cancel the current method allowing the user to revert and restart the method without disconnecting.

A further variation to the current embodiment introduces features of security using the "0" command. In a method analogous to the now standard and accepted mobile "key guard" function activated on the handset itself when a user presses the menu button followed by the star key (menu star) and which prevents inadvertent key presses when carrying the mobile the star commanded equivalent now delivers enhanced key protection services activated centrally within the network rather than locally on the handset itself.

When the zero command directly precedes the star command as in "0*" then the method signals the network to guard the keypad from signaling any star command inadvertently and more importantly when combined with numerical input as in "0*pin*" securing access to all star transfer methods from the associated subscriber SIM locking the keyboard virtually in the network so to speak. The method commanding the star lock is typically only applied to methods which carry financial risk.

This security feature may be engaged automatically after a preset idle period during which no star transactions were commanded by the subscriber and then when next requiring the services the PIN entered once for multiple transactions and more pragmatically the PIN only required when star transaction amounts exceed accepted minimums to reduce risk associated with lost mobiles and unauthorized transactions. PIN code security thus typically only applies to the star transfer and enhanced commands and then again PIN authorization is only requested when the star transfer amount exceeds preset minimums set by the network and/or subscriber and thus PIN disabled to allow convenient and frequent small transactions and in particular is not applied at all when commanding the standard star method which simply collects the current call cost.

It will be appreciated that the command signaling and method invocation described in the present invention delivers simple and effective telephonic services and transactions performed between parties identified through dialing regular directory telephone numbers.

A fundamental difference between the present invention and proposals utilizing the mobile telephone as a transaction terminal is that this invention operates in conjunction with a conventional telephony call compared to the complex and relatively over-engineered data methods.

Further it must be appreciated that the methods described herein may be implemented in many ways and it must be appreciated that although the invention has been described in the mobile telecommunications context, it is equally applicable to conventional networks and further to inter network operation.

To further summarise the invention, in all universal signaling systems at least three states are provided and color-coded, namely Green (GO), Orange (SHIFT) and Red (STOP). As described above in the Background section of this specification, the phenomenon in mobile telephony is that the current design only permits the user to signal two states, namely Green (SEND) and Red (END). The industry thus became known as "SEND and END", reflecting on these two fundamental buttons and the actions they performed (connect/disconnect). This binary signaling system is a legacy carried over from fixed line telephony where, similarly, the two states "off/on hook" are indicated.

The present invention describes a universal and seamless method that enables the user and the network operator to signal "Orange" to SHIFT and engage an interactive service mode on the regular dial addressed connection. This newly signaled state is titled "Star mode" (*mode) and in correcting this fundamental omission in mobile signaling succeeds in bridging the Voice and Data addressability divide switching the context on demand and in an easy and efficient manner. This present invention thus discloses a single additional signal issued by the Caller (A) and/or Called (B) and/or Operator (MS/C) to now switch the connection into an intermediary state. In other words, the present invention describes signaling to seamlessly engage interactive mode and automated service on the regular A/B (Caller/Called) dial addressed telephonic connection. "Regular" in the sense that no special codes and/or additional address information is required to invoke the methods and services described in this present invention, and "Dial" as in typically the address is entered using the standard 12 numeric keys found on conventional telephone equipment.

The invention claimed is:

1. A method of conducting a service or transaction between a caller and a call recipient on a telephony network, the method comprising:
   at a telephony service location remote from a caller and a call recipient:
      receiving, from the caller, a telephony request for establishing a connection to the call recipient the request having been initiated by the caller specifying a number associated with the call recipient;
      receiving, from a communication device of the caller, a command signal during a call connect process, the command signal being a single command other than a standard call connect command, the call connect process including at least one phase from a group consisting of a dial phase and an originating phase, the call connect process being before a logical association between the caller and the call recipient; and
      in response to receiving the command signal, and without connecting through to the call recipient during the telephony request, conducting a service or transaction between the caller and the call recipient other than a standard call connection transaction.

2. The method according to claim 1, wherein the received command signal is associated with the activation of single key on a keypad of the communication device of the caller.

3. The method according to claim 2, wherein the activation of a single key includes activating a single key from a plurality of keys, wherein each of the plurality of keys is associated with a service or transaction from among a plurality of services and transactions.

4. The method according to claim 3,
   wherein the plurality of keys includes at least one key from the group consisting of a "*" key, a "#" key, and a "0" key.

5. The method according to claim 1, further comprising prompting the caller to provide the command signal.

6. The method according to claim 1, wherein the command signal is initiated by the caller prior to the originating phase.

7. The method according to claim 6, wherein the command signal is initiated by prefixing the command signal to a telephone number.

8. The method according to claim 1, wherein the communication device of the caller is a telephone, and wherein the telephone, upon activation of a dedicated key, transmits the command signal.

9. The method according to claim 8, wherein the dedicated key is selected from a group comprising a "@" symbol, a color coded key, a programmable key, and a button.

10. The method according to claim 1, wherein the command signal is initiated upon activation of a biometric trigger.

11. The method according to claim 10, wherein the biometric trigger is based on either voice or fingerprint recognition.

12. The method according to claim 1, further comprising associating the service or transaction with the caller as identified by a telephone number of the caller.

13. The method according to claim 12, wherein the telephone number of the caller is derived from a caller line identity (CLI).

14. The method according to claim 1, further comprising associating the service or transaction with the command signal based on the call recipient.

15. The method according to claim 1, wherein the service or transaction is an override of a conventional billing protocol of the telephony network supporting the telephony service.

16. A telephony service system comprising:
   a telephony service network remote from a caller and a call recipient, the telephony service network configured to:
      receive, from the caller, a telephony request for establishing a connection to the call recipient, the request having been initiated by the caller specifying a number associated with the call recipient;
      receive from a communication device of the caller a command signal during a call connect process, the command signal being a single command other than a standard call connect command, the call connect process including at least one phase from a group consisting of a dial phase and an originating phase, the call connect process being before a logical association between the caller and the call recipient; and
      in response to the command signal, and without connecting through to the call recipient during the telephony request, conduct a service or transaction between the caller and the call recipient other than a standard call connection transaction.

17. The system of claim 16, wherein the received command signal is associated with the activation of a single key on a keypad of the communication device of the caller.

18. The system of claim 17, wherein the activation of a single key includes the activation of a single key from a plurality of keys, wherein each of the plurality of keys is associated with a service or transaction from among a plurality of services and transactions.

19. The system of claim 18, wherein the plurality of keys includes at least one from the group consisting of a "*" key, a "#" key, and a "0" key.

20. The system of claim 16, wherein the telephony service network is further configured to prompt the caller to provide the command signal.

21. The system of claim 16, wherein the command signal is initiated by the caller prior to the originating phase.

22. The system of claim 21, wherein the command signal is initiated by prefixing the command signal to a telephone number of the call recipient.

23. The system of claim 16, wherein the communication device of the caller is a telephone, and wherein the telephone, upon activation of a dedicated key, transmits the command signal.

24. The system of claim 23, wherein the dedicated key is selected from a group comprising a "@" symbol, a color coded key, a programmable key, and a button.

25. The system of claim 16, wherein the command signal is initiated upon activation of a biometric trigger.

26. The system of claim 25, wherein the biometric trigger is based on either voice or fingerprint recognition.

27. The system of claim 16, wherein the telephony service network is further configured to associate the service or transaction with the caller as identified by a telephone number of the caller.

28. The system of claim 27, wherein the telephone number of the caller is derived from a caller line identity (CLI).

29. The system of claim 16, wherein the telephony service network is further configured to associate the service or transaction with the command signal based on the call recipient.

30. The system of claim 16, wherein the service or transaction is an override of a conventional billing protocol of the telephony network supporting the telephony service.

* * * * *

UNITED STATES PATENT AND TRADEMARK OFFICE
CERTIFICATE OF CORRECTION

| | | |
|---|---|---|
| PATENT NO. | : 8,275,119 B2 | Page 1 of 1 |
| APPLICATION NO. | : 10/562343 | |
| DATED | : September 25, 2012 | |
| INVENTOR(S) | : Kahn | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 57 days.

Signed and Sealed this
Nineteenth Day of August, 2014

Michelle K. Lee
*Deputy Director of the United States Patent and Trademark Office*